United States Patent [19]

Tamura et al.

[11] 4,274,735
[45] Jun. 23, 1981

[54] DISTANCE MEASURING DEVICE

[75] Inventors: Shuichi Tamura; Yukichi Niwa, both of Yokohama; Masahiko Ogawa, Hino; Mitsutoshi Owada, Yokohama; Noriyuki Asano, Kawasaki, all of Japan

[73] Assignee: Canon Kabushiki Kaisha, Tokyo, Japan

[21] Appl. No.: 40,473

[22] Filed: May 18, 1979

[30] Foreign Application Priority Data

May 25, 1978 [JP] Japan .................................. 53-63048

[51] Int. Cl.³ .......................... G01C 3/00; G01C 5/00; G03B 7/08
[52] U.S. Cl. .................................... 356/1; 250/214 B; 354/25
[58] Field of Search ......................... 354/25; 356/1, 4; 250/201, 204, 214 B

[56] References Cited

U.S. PATENT DOCUMENTS

| 3,723,003 | 3/1973 | Vockenhuber et al. | 356/4 |
| 4,040,738 | 8/1977 | Wagner | 356/4 |
| 4,065,778 | 12/1977 | Harvey | 354/25 |
| 4,166,948 | 9/1979 | Steffen | 250/214 B |

OTHER PUBLICATIONS

Japanese Laid-Open Specification #Sho 49-49625.

Primary Examiner—S. C. Buczinski

[57] ABSTRACT

A distance measuring device is disclosed. This device has light projecting means. Light is projected from this projecting means to a target, and the concurrently reflected light from the target is received by photoelectric light receiving means which is provided with a plurality of photosensitive elements independent of each other and arranged in such predetermined distances from the above described light projecting means as to correspond to individual object distances different from each other. From the concurrent state of output of said photoelectric light receiving means there can be detected a distance to the above described target.

16 Claims, 12 Drawing Figures

DISTANCE MEASURING DEVICE

BACKGROUND OF THE INVENTION

1. Field of the Invention

This invention relates to distance measuring devices, and, more particularly, to a distance measuring device having light projecting means provided therein to project light to a target, and in which the concurrent reflected light from the target is received by photoelectric means provided with a plurality of photosensitive elements operative independently of each other and arranged in predetermined spaced relation to the above described light projecting means so as to correspond to respective different target distances. In this manner the output of the light receiving means is processed to recognize the distance to the above described target.

2. Background of the Prior Art

Distance measuring devices of the so-called "active" type having light projecting means provided on the device side to project light to a target with the concurrent reflected light from the target being utilized to detect the distance to the target have been very often proposed in connection with the automatic in-focus detecting and automatic focusing devices for use in cameras.

For example, among others, the applicants of the present invention have proposed a distance measuring device of the active type as applied to an automatic focusing device for use in a camera in Japanese Patent Laid-Open Specification No. Sho 49-49625. According to this proposal, the photoelectric light receiving means for receiving the reflected light from the above described target is provided with a plurality of photosensitive elements independent of each other, and these elements are arranged in respective positions spaced from the light projecting means by predetermined base line distances so as to correspond to different target distances from each other. From the state of the output of this photoelectric light receiving means, detection is made as to which photosensitive element receives the reflected light from the target to measure the distance to said target. For distance detection, the device of such construction operates in such a manner that the light projecting means first projects light to the target while simultaneously permitting the outputs of the individual photosensitive elements to be stored on respective condensers. Then, after that, the light projection from the light projecting means is stopped, with the resultant outputs of the photosensitive elements being compared with the previously memorized values on the condensers by means of respective difference amplifiers.

By sensing a concurrent output from one of the difference amplifiers, which of the above described plurality of photosensitive elements receives the reflected light from the target is detected so as to provide measure of the distance to the target. By this method, it is made possible to effectively remove the influence of light other than the projection light (that is, the light serving as the external disturbing light in this kind of device to give rise to a loss in the accuracy of distance measurement), and therefore to achieve an increase in the accuracy of distance measurement.

The device according to this proposal requires, much improvement. For example, in this device, the light receiving element is formed with a light responsive resistor such as a CdS, and from the circuit point of view, the individual light receiving elements are connected to respective resistors with the junction points therebetween, that is, the potential dividing points being connected to respective storing condensers. The voltages on the individual condensers are applied to respective individual difference amplifiers at one of the inputs thereof, the opposite inputs of which are supplied with the voltages from the potential dividing points. It is noted here that since each condenser memorizes the voltage dependent upon the resistance value of each photosensitive element, in order to obtain a voltage of level high enough to assure the detection, the intensity of light projected from the light projecting means must be increased. In application to instruments of small size and particularly to cameras employing an electrical power source of limited capacity there are yet much more problems left to be overcome. Again, along with this, when the environment is bright, the potentials at the above described potential dividing points become high even in the state where the light projection from the light projecting means is cut off. As a result, the level of noise component is increased, and, therefore, the output level of the difference amplifier is considerably reduced. Thus, there is a high possibility of encountering situations where the distance measurement is impossible.

Another problem is that, as the environmental illumination varies to a large extent from a time point at which light is projected from the light projecting means to a time point at which the light projection is stopped, because this variation can not be compensated for, an error operation will be resulted. Besides this, since the output terminals of the difference amplifiers are scanned successively by a slide tap to detect the effective output representative of the actual distance to the target, if the reflected light from the target is incident upon two adjacentones of the photosensitive elements at a time, and therefore the corresponding two difference amplifiers produce effective outputs, the scanning operation by the slide tap results in detecting the output terminal of the first difference amplifier counting in a direction in which the slide tap is moved to scan regardless of which photosensitive element of the two receives more light. At this time, when the photosensitive element cooperative with the second difference amplifier receives more reflected light, no true distance measurement can be effected.

SUMMARY OF THE INVENTION

An object of the present invention is to provide a distance measuring device which overcomes the above mentioned conventional drawbacks.

Another object of the present invention is to provide a distance measuring device in which although the intensity of light projected from light projecting means is very weak, a signal of sufficient level as the detection output can be obtained, and which never brings out the incapability of distance measurement, or faulty operation even when the environment is bright, or when the environmental illumination varies during the distance measuring operation, and is capable of achieving a further improvement in the accuracy of distance measurement.

These and other objects of the present invention will become apparent from the following detailed description of preferred embodiments thereof taken in conjunction with the accompanying drawings in which:

DESCRIPTION OF THE PREFERRED EMBODIMENTS

Figure 1A:
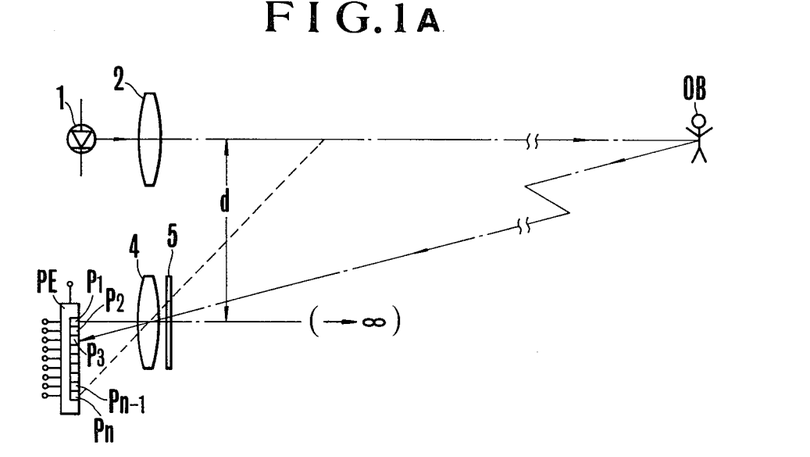
FIG. 1A is a schematic diagram illustrating the principles of the distance measurement in a device of the present invention.
Figure 1B:
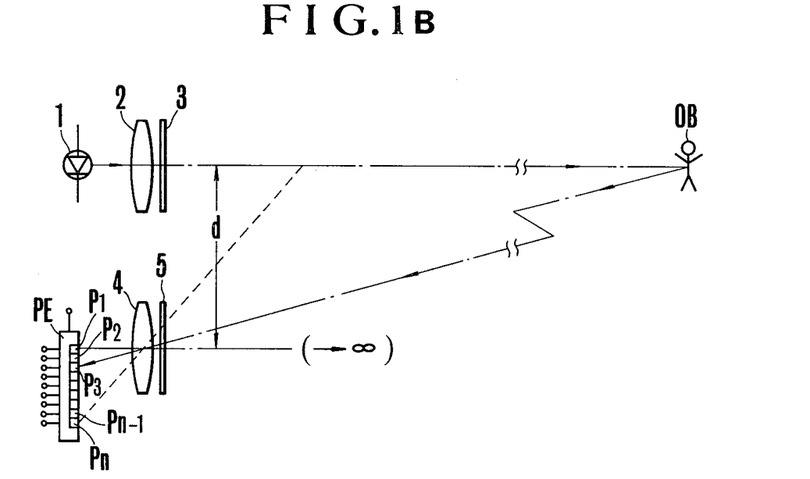
FIG. 1B is a similar diagram illustrating the principles of the distance measurement in a second device of the present invention.

With reference first to FIG. 1A, the principles of distance measurement in the device of the present invention will be described below. In the figure, 1 is a light source such as a lamp or light-emitting diode; 2 is a projection lens for projecting light from said light source 1 in the form of a minute parallel beam to an object OB. It is noted that in order to distinguish the projection light from the ambient light, it is preferred to select a near infrared ray, or infrared ray source for employment as the light source 1, or to arrange an infrared filter in front of the projection lens 2 as shown in FIG. 1B so that the transmitted light is near infrared or infrared; 4 is a light collecting lens with its optical axis spaced from that of the projection lens 2 by a predetermined base line distance, d; 5 is a filter arranged in front of said light collecting lens 4 to transmit only the same spectral range of light as that of the projection light; PE is a photoelectric light receptor consisting of n photovoltaic type light sensitive elements P1 to Pn such as silicon photo-cells arranged, as shown in the figure, near a focal plane of the above described light collecting lens 4 in such relation to each other that the 1st and n-th photosensitive elements P1 and Pn correspond to infinite and shortest object distances respectively (therefore, the other photosensitive elements P2, P3, .. . Pn−1 correspond to intermediate different object distances from each other).

With such arrangement, let us now assume that a beam of light projected through the projection lens 2 is reflected by the object OB as the target to pass through the filter 5, reaching the light collecting lens 4 by which the reflected light is converged on the light receptor PE at a specific photosensitive element (P3 in the figure), the concurrent state of output of said light receptor PE provides information of which photosensitive element the reflected light from the object OB is most strongly incident. According to the present invention, the individual photosensitive elements P1, P2, P3, . . . , Pn−1 and Pn in the above described photoelectric light receptor PE are provided with respective pairs of first and second signal memory members for individually memorizing the signals produced from the photosensitive elements P1, P2, P3, . . . , Pn−1 and Pn. Thus, the total number of first memory members is equal to that of said photosensitive elements P1 to Pn, and the total number of second memory members is also equal to n. The operation of the above described light source 1 is controlled to intermittently produce light at a predetermined frequency, while the transfer of the signals from the photosensitive elements P1 to Pn is simultaneously controlled in such a manner that when the light source 1 produces light, the signals produced from the photosensitive elements P1, P2, P3, . . . , Pn−1 and Pn are transferred to and stored in the respective memory members in the first group while being integrated. When the light source 1 produces no light, the signals produced from the individual photosensitive elements P1, P2, P3, . . . , Pn−1, Pn, are transferred to and stored in the second group of memory members while being integrated. Then, a difference between the signals memorized for the first and second members in each pair is obtained through an individual differential circuit. Then, the signal differences corresponding to the individual photosensitive elements P1, P2, P3, . . . , Pn−1, Pn are compared with one another through comparing circuits to detect which of the photosensitive elements P1–Pn most strongly receives the reflected light from the object OB. Thus, the distance to the object OB is recognized.

In other words, according to one feature of the present invention, the reflected light is detected in isolation from ambient light, for the integrated valuations of output of the photosensitive elements P1, P2, P3, . . . , Pn−1, Pn stored on the first group of signal memory members are responsible to the light reflected from the object OB after projection from the light source 1 as well as to the part of the ambient light which has the same spectral range as that of the projected light (namely, near infrared, or infrared component), while the integrated valuations of output of the photosensitive elements P1, P2, P3, . . . , Pn−1, Pn stored on the second group of signal memory members are, on the other hand, responsive to only that part of the ambient light. Therefore, if the differences between the memorized signals in the first and second groups of signal memory members correlated to each other with respect to the individual photosensitive elements P1, P2, P3, . . . , Pn−1, Pn are obtained through the differential circuits, the integrated values of output of the individual photosensitive elements which depend purely on only the light coming from the object OB in reflection therefrom after having been projected from the device side, can be detected. As the reflected light is accumulated a number of times successively, therefore, even when the intensity of light projected from the light source 1 is weak, it is possible to obtain a signal whose level is high enough to derive the distance information. Again, even when the environment is very bright, or when the environmental illumination varies to a large extent during the distance measuring operation, because of the perfect removal of the influence of the ambient light at this time, the distance can be measured with sufficient assurance of the high accuracy and reliability.

Figure 2:
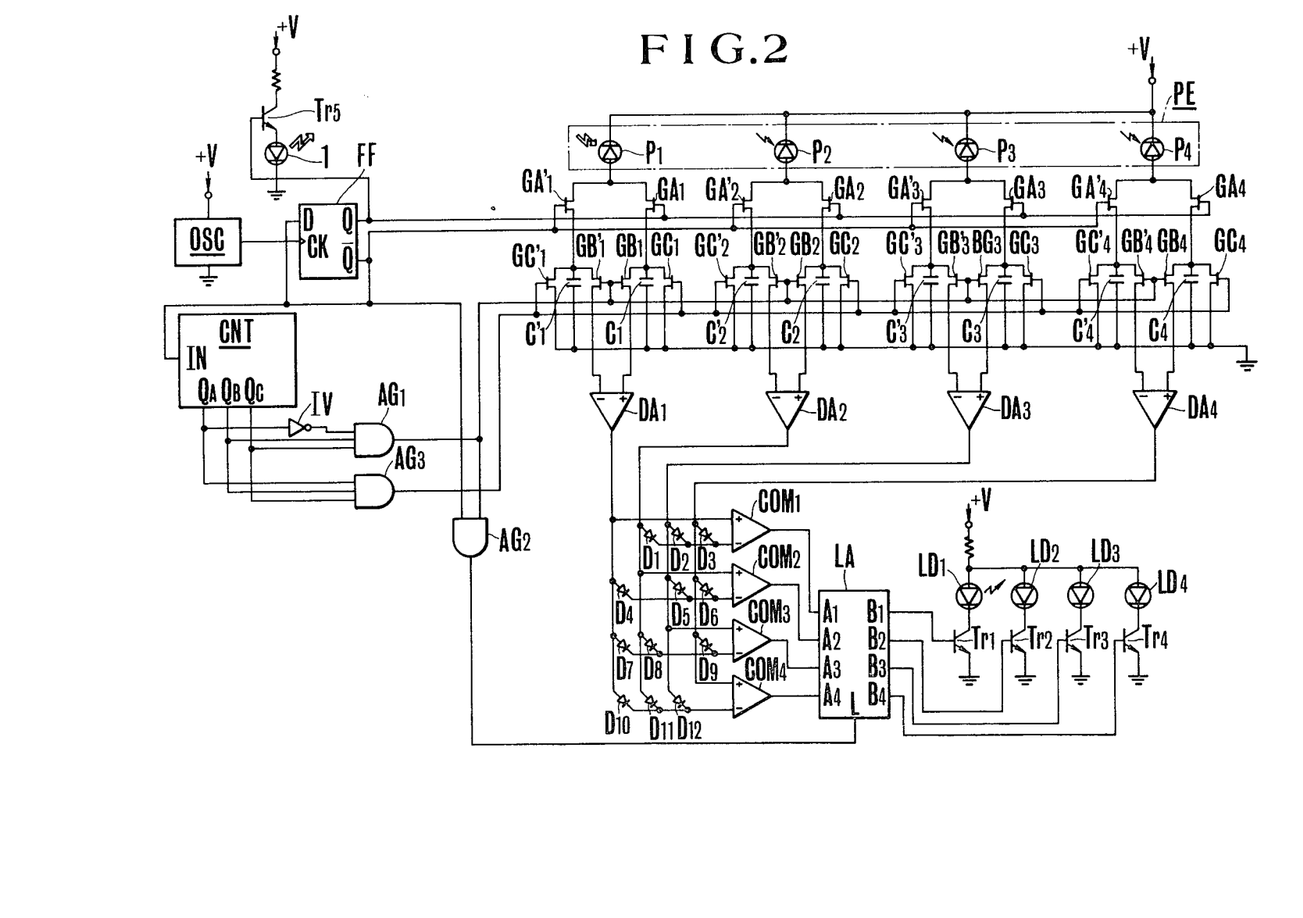
FIG. 2 is an electrical circuit diagram of one embodiment of a circuit system according to the present invention.

Referring to FIG. 2, there is shown one embodiment of a control circuit for the distance measuring device according to the present invention. It is noted that the embodiment shown in FIG. 2 is adapted to limit the number of photosensitive elements in the above described photoelectric light receptor to four, namely, P1 to P4, with the first photosensitive element P1 covering a far distant zone including infinite distance, and the 4th element P4 covering a closeup zone including the shortest object distance. The 2nd and 3rd photosensitive elements P2 and P3 cover intermediate slightly farther and shorter object distance zones respectively. Thus, the entire range of object distances is detected in terms of four range zones.

At first, the construction and arrangement of circuit elements will be explained. In the figure, PE is the above described photoelectric light receptor having four photovoltaic type light receiving elements P1 to P4 (shown in the figure as silicon photodiodes) as has been mentioned above, arranged behind the above described light collecting lens 4 to cover the respective range zones of far, slightly far, slightly shorter and shortest distances respectively. Each of the silicon photo diodes P1, P2, P3 and P4 is supplied with a bias voltage V. C1 to C4, and C'1 to C'4 are memory elements provided in correspondence to the individual photo diodes P1, P2, P3 and P4 to individually memorize the output potentials of the photo diodes P1, P2, P3 and P4, the memory elements C1 to C4 constituting a first group of signal memory elements, and the memory elements C'1 to C'4 constituting a second group of signal memory elements. For such memory elements C1–C4 and C'1–C'4, suitable use may be made of, for example, tantalum condensers of low leakage current characteristics. Since the photo diodes P1, P2, P3 and P4 are each fed with the bias voltage V, each of the memory elements C1, C2, C3, C4 and C'1, C'2, C'3, C'4 is here made to accumulate the output voltages of the corresponding one of the photo diodes P1, P2, P3, P4.

GA1–GA4 are gate elements such as FETs provided between the individual photo diodes P1, P2, P3, P4 and memory elements C1–C4 in the first group to control the flow of the output currents from the photo diodes P1, P2, P3, P4 to the respective memory elements C1, C2, C3, C4 and GA'1–GA'4 are gate elements such as FETs provided between the individual photo diodes P1, P2, P3, P4 and memory elements C'1–C'4 to control the flow of the output currents from the photo diodes P1, P2, P3, P4 to the respective memory elements C'1, C'2, C'3, C'4. The gate elements GA1–GA4 constitute a first group of gate elements, and the gate elements GA'1–GA'4 constitute a second group of gate elements.

DA1–DA4 are difference amplifiers for deriving differences between the memorized values on the memory elements in the first and second groups correlated to each other with respect to the individual photo diodes P1, P2, P3 and P4, namely, C1 and C'1, C2 and C'2, C3 and C'3, C4 and C'4, with their non-inversion inputs all fed with the memorized values of the respective memory elements C1, C2, C3, C4 in the first group, and with their inversion inputs all fed with the memorized values of the respective memory elements C'1, C'2, C'3 and C'4.

GB1–GB4 and GB'1–GB'4 are gate elements such as FETs for controlling the supplying of the memorized signals on the individual memory elements C1, C2, C3, C4 and C'1, C'2, C'3, C'4 in the first and second memory element groups to the respective difference amplifiers DA1, DA2, DA3, DA4; GC1–GC4 and GC'1–GC'4 are switching elements such as FETs for clearing the respective memory elements C1, C2, C3, C4 and C'1, C'2, C'3, C'4 with their drain electrodes all grounded.

COM1 is a comparator for comparing the output of the difference amplifier DA1 with the output of each of the other difference amplifiers DA2–DA4 to produce a high level signal when the output of the difference amplifier DA1 is larger than any one of the outputs of the other difference amplifiers DA2–DA4, and to produce a low level signal when it is smaller; COM2 is a comparator for comparing the output of the difference amplifier DA2 with the output of each of the other difference amplifiers DA1, DA3, DA4 to produce a high or low level signal when the output of the difference amplifier DA2 is larger or smaller than any one of the outputs of the difference amplifiers DA1, DA3, DA4; COM3 is a comparator for comparing the output of the difference amplifier DA3 with the output of each of the other difference amplifier DA1, DA2, DA4 to produce a high or low level signal when the output of the difference amplifier DA3 is larger or smaller than any one of the outputs of the other difference amplifiers DA1, DA2, DA4; COM4 is a comparator for comparing the output of the difference amplifier DA4 with the output of each of the other difference amplifiers DA1–DA3 to produce a high or low level signal when the output of the difference amplifier DA4 is larger or smaller than any one of the outputs of the difference amplifiers DA1–DA3. D1–D12 are reverse current preventing diodes.

LA is a 4-bit latch circuit for holding all the outputs of the comparators COM1–COM4; LD1–LD4 are light-emitting diodes for indicating the range zone of the target object; Tr1–Tr4 are switching transistors for controlling energization of the light-emitting diodes LD1, LD2, LD3, LD4 with their bases connected to the respective outputs B1, B2, B3, B4 of the above described latch circuit LA. Therefore, upon selection of any one of the light-emitting diodes LD1, LD2, LD3, LD4 for energization, the corresponding range zone of far distance, slightly far distance, slightly closeup, or closeup is indicated.

Figure 3:
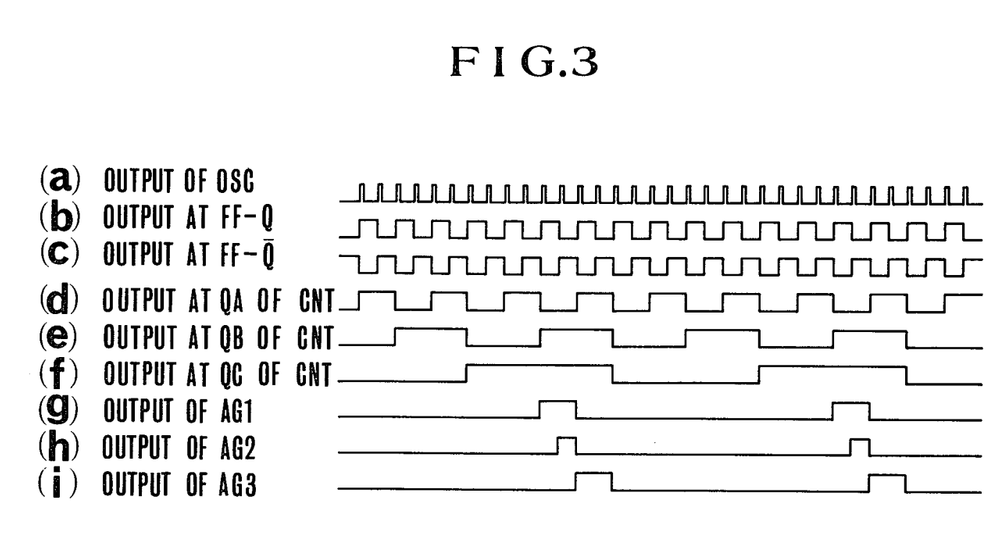
FIG. 3 is a timing chart of output signals from the blocks in the circuitry of FIG. 2.

OSC is an oscillator for producing a clock pulse train (FIG. 3(a)) at a relatively low frequency on the order of several hundreds of Hz to several KHz; FF is a D type flip-flop responsive to the clock pulse from the oscillator OSC to be triggered, with its $\overline{Q}$ output connected to its D input, and with its Q output (FIG. 3(b)) connected both to the base of a switching transistor Tr5 controlling energization of the light source 1 and to the control input of each of the gate elements GA1, GA2, GA3, GA4 in the above described first group. The control input of each of the second gate elements GA'1, GA'2, GA'3, GA'4 is connected to the $\overline{Q}$ output of the flip-flop FF. Thus, only when the Q output of the flip-flop FF takes a high level, is the transistor Tr5 rendered conducting, causing the light source to intermittently produce light each in a predetermined period. During the time when the light source 1 is lit, the first group of gate elements GA1–GA4 are all gated on by the $\overline{Q}$ output of the flip-flop FF, thereby the concurrent outputs of the photo diodes P1, P2, P3, P4 are fed to the memory elements C1, C2, C3, C4 respectively, and are integrated therein. On the other hand, when the light source 1 is quenched, the first group of gate elements are gated off at this time, and instead the second group of gate elements GA'1-GA'4 are all gated on by the $\bar{Q}$ output of the flip-flop FF, thereby the concurrent output currents of the individual photo diodes P1, P2, P3, P4 are allowed to flow to the respective memory elements C'1, C'2, C'3, C'4 in the second group, where they are stored while being integrated.

CNT is a binary counter for counting the Q outputs of the above described flip-flop FF in synchronism with the falling edge of the $\bar{Q}$ output; AG1 is an AND gate for taking AND of the inverted signal from the QA output (FIG. 3(d)) of said counter CNT by an inverter IV, and the QB and QC outputs (FIG. 3(e), 3(f)) thereof with its output (FIG. 3(g)) connected to the control inputs of the gate elements GB1-GB4 and GB'1-GB'4, whereby only when the output of said AND gate AG1 is of high level, are the gate elements GB1-GB4 and GB'1-GB'4 gated on. At this time, the voltages accumulated on the first and second groups of memory elements C1-C4 and C'1-C'4 are simultaneously applied to the difference amplifiers DA1, DA2, DA3, DA4 at their non-inversion and inversion inputs, respectively.

AG2 is an AND gate for taking AND of the output of said AND gate AG1 and the $\bar{Q}$ output of the flip-flop FF, with its output (FIG. 3(h)) serving as a latch signal for the latch circuit LA, whereby when the output of said AND gate AG2 changes from the low to the high level, the latch circuit LA is actuated in synchronism with the rising edge (that is, the latch circuit LA is of the rising synchronization type) to latch the states of its inputs A1-A4, that is, the outputs of the comparators COM1-COM4, and to hold them until the next latch signal is fed.

AG3 is an AND gate for taking the AND condition of all the outputs of the above described counter CNT with its output (FIG. 3(i)) connected to the control inputs of the gate elements GC1-GC4 and GC'1-GC'4 accordingly, only when the output of the AND gate AG3 is of high level, are the gate elements GC1-GC4 and GC'1-GC'4 gated on to clear up the memorized values of the first and second groups of memory elements C1-C4 and C'1-C'4.

It is noted here that since the outputs of the AND gates AG1, AG2, AG3 are related to each other as shown in FIGS. 3(g), (h), (i), the application of the voltages on the first and second groups of memory elements C1-C4 and C'1-C'4 to the difference amplifiers DA1-DA4 is followed by the actuation of the latch circuit LA for latching the outputs of the comparators COM1-COM4, and then by clearing up the memorized values of the memory elements C1-C4 and C'1-C'4.

In operating the circuit of such construction, while the device is aligned with the target object OB, a power switch (not shown) is now thrown to supply the various circuit portions of FIG. 2 with the voltage V; thereupon the oscillator OCS starts to produce a clock pulse train at the predetermined frequency as shown in FIG. 3(a). Responsive to the clock pulses from the oscillator OSC, the flip-flop FF operates with repeated inversion of its outputs Q and $\bar{Q}$ as shown in FIG. 3(b) and 3(c). Then, by the changes in the output Q of the flip-flop FF, the transistor Tr5 is turned on and off successively, causing the light source or light emitting diode 1 to be intermittently energized with production of a continuous succession of light pulses of predetermined duration. The rays of light from the light-emitting diode 1 while being collimated to a narrow beam are projected to the target object OB by the projection lens 2. The reflected light rays from the object OB, after having passed through the filter 5, are collected by the lens to converge onto the one of the photo diodes P1-P4 which corresponds to the actual object distance.

On the other hand, the first and second groups of gate elements GA1-GA4 and GA'1-GA'4 are alternately turned on and off in sequence by the changes of the outputs Q and $\bar{Q}$ of the flip-flop FF. Then, it is here that since the individual phot diodes P1, P2, P3, P4 are biased by the voltage V, as the first group of gate elements GA1-GA4 are turned on, the output voltages of the individual photo diodes P1, P2, P3, P4 are transferred to and stored in the respective individual memory elements C1, C2, C3, C4 in the first group while being integrated. And, as the second group of gate elements GA'1-GA'4 are turned on, while the first group of gate elements GA1-GA4 are turned off, the output voltages of the photo diodes P1-P4 are transferred to and stored in the respective memory elements C'1, C'2, C'3, C'4 in the second group while being integrated. In this case, therefore, since the ON and OFF operation of the gate elements GA1-GA4 and GA'1-GA'4 is controlled by the same outputs of the flip-flop FF as that for the transistors Tr5, those of the successive outputs of the individual photo diodes P1, P2, P3, P4 which occur when the light emitting diode 1 is in the energized state are in effect accumulated and memorized in the respective memory elements C1, C2, C3, C4, and the other successive alternate outputs in the second group of memory elements C'1, C'2, C'3, C'4. Thus, memorized on the first group of memory elements C1, C2, C3, C4 are the integrated values of the outputs of the light receiving elements P1, P2, P3, P4 responsible both to the light coming from the target object OB after having been shot by the projection light and then having been reflected therefrom and to that component of the ambient light which has the same wave-length region as that of the projection light (that is, the near infrared region, or infrared region). Further memorized on the second group of memory elements C'1, C'2, C'3, C'4 are the integrated values of the outputs of the light receiving elements P1, P2, P3, P4 responsible to only that spectral region of the ambient light.

Since such memorizing operation proceeds repeatedly, when the number of $\bar{Q}$ output pulses of the flip-flop FF counted by the counter CNT has reached such a value that the outputs QA, QB and QC of the counter CNT become low, high and high levels respectively, all the three inputs of the AND gate AG1 become high level with its output being changed to the high level at this point of time, as shown in FIG. 3(g). Thus, the gate elements GB1-GB4 and GB'1-GB'4 are turned on to permit application of the voltages memorized on the first and second groups of memory elements C1, C2, C3, C4 and C'1, C'2, C'3, C'4 to the difference amplifiers DA1, DA2, DA3, DA4 at their non-inversion and inversion inputs respectively.

Thus, the first cycle of distance measuring operation has been completed at this time with the result that the individual difference amplifiers DA1, DA2, DA3, DA4 produce output voltages representative of only those of the outputs individual light receiving elements P1, P2, P3, P4 which are purely responsible to the distance measuring light projected from the device side in isolation from the ambient light until the above mentioned occurrence of change of the output of the AND gate AG1 to the high level. Then the outputs of the difference amplifiers DA1, DA2, DA3, DA4 are compared with one another by the comparators COM1, COM2, COM3, COM4. As a result, only the particular comparator whose non-inversion input is supplied with the largest output among those of the difference amplifiers DA1-DA4 which produces a high level signal, all of the other three comparators producing low level signals. Then, after a short time, but before the output of the AND gate AG1 changes to the low level, when the output $\overline{Q}$ of the flip-flop FF becomes of high level, as shown in FIG. 3(h), the output of the AND gate AG2 is changed to the high level at which the latch circuit LA is actuated to latch all the outputs of the above described comparators COM1-COM4 and to supply them to the respective transistors Tr1-Tr4. At this point in time, therefore, of these transistors Tr1-Tr4 there is only one that is rendered conducting upon receipt of the high level output from said latch circuit LA. Thus, one of the indicators or light-emitting diodes LD1-LD4 is lit alone to present the indication of the consistent range zone to the target object OB.

For example, let us now assume that after the light projection is made from the device, the reflected light from the target object OB is most strongly incident upon the first photo diode P1, then the output of the difference amplifier DA1 is made larger than any one of the outputs of the other difference amplifiers DA2-DA4, causing only the comparator COM1 to produce the high level signal, while the other comparators COM2-COM4 producing all the low level outputs, thereby only the output B1 of the latch circuit LA is taken at the high level, while the other three outputs B2-B4 at the low level. Thus, the transistor Tr1 is selected for conduction to energize the light-emitting diode LD1, indicating that the target object OB lies in the far distant zone.

After all the outputs of the comparators COM1-COM4 have been latched in the latch circuit LA, the output QA of the counter CNT is changed to the high level in synchronism with the next clock pulse. At this time, all the outputs QA, QB and QC of the counter CNT take the high level, causing the AND gate AG3 to produce the high level output as shown in FIG. 3(i), and therefore causing the gate elements GC1-GC4 and GC'1-GC'4 to be turned on. Thus, all the memory elements C1-C4 and C'1-C'4 are cleared in memory value. Then, when the output of the AND GATE AG3 changes from the high to the low level, the next cycle of distance measuring operation beginning with the memorizing of the outputs of the photo diodes P1-P4 on the memory elements C1-C4 and C'1-C'4 is repeated again.

Figure 4:
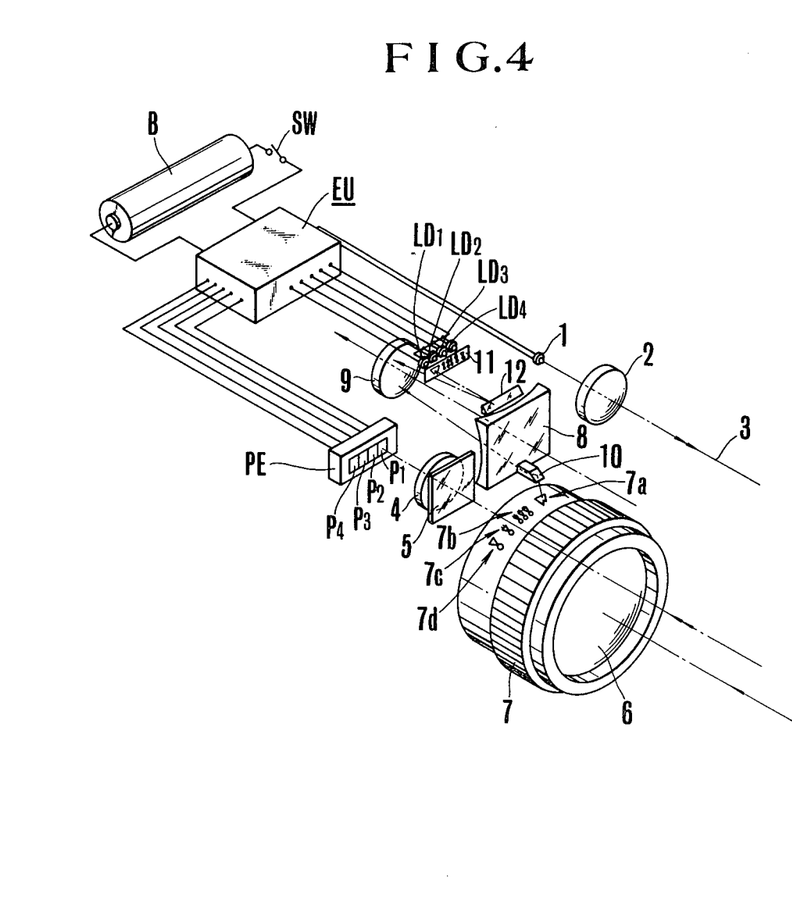
FIG. 4 is an exploded perspective view of an example of a visual focusing system employing the embodiment of FIG. 2 as applied to a zone type automatic distance measuring device in a camera.

This embodiment of the device shown in FIG. 2 having the functions of detecting the range zone of the target object OB and indicating the result therefrom in the above described manner is particularly suited to be used as a zone type automatic distance meter system in the middle class still camera for the biginner, or in the 8 m/m cine camera. By reference to FIG. 4, therefore, an example of application of the device of FIG. 2 to the zone type distance metering system as incorporated in the cine camera or still camera will be described below. In FIG. 4, the same reference characters have been employed to denote the similar parts to those shown in FIGS. 1 and 2.

In FIGS. 4, 6 is a photo-taking lens; 7 is a distance adjusting ring for the lens 6 having printed thereon marks 7a, 7b, 7c and 7d indicating the respective range zones of farthest, farther, nearer and nearest distances respectively; 8 and 9 are respectively an objective lens and an eye-piece constituting part of a finder optical system; 10 is a twice-reflection prism of small size fixedly secured to the above described finder objective lens 8 at the central bottom margin of the front surface thereof and so oriented that, of the zone marks 7a to 7d on the distance adjusting ring 7, one mark correspondsing to the range zone for which the photo-taking lens 6 is focused is projected to a display window 13a near the bottom edge of a field of view of the finder 13 (see FIG. 5); 11 is a mask plate made of, for example, an opaque material and provided with four openings 11a, 11b, 11c and 11d similar in shape to those 7a, 7b, 7d and 7c on the distance adjusting ring 7 in alignment with the respective light-emitting diodes LD1, LD2, LD3 and LD4 and in front of them so that the zone marks 11a, 11b, 11c and 11d are selectively illuminated from the rear thereof to display the range zones of farthest, farther, nearer and nearest distances; 12 is a small reflection prism of wedge shape arranged adjacent the rear surface of the above described finder objective lens 8 at the upper side to project the zone marks 11a, 11b, 11c and 11d in the above described mask plate 11 to a field of indication just above the finder field of view 13; EU is a circuit unit in which the circuitry of FIG. 2 except the light source 1, light receptor PE and light-emitting diodes LD1-LD4 is fabricated in as much an integrated circuit form as possible, and is shielded in a common package; B is an electrical power source or battery; SW is a power switch which may be arranged to be closed, for example, when a two-stroke type camera release button (not shown) is depressed to the first stroke, from the stand point of convenience.

Figure 5:
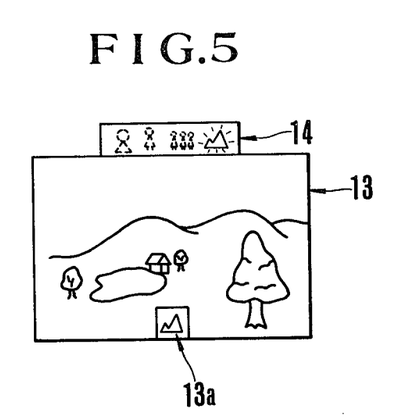
FIG. 5 is a pictorial representation illustrating various images appearing to an observer looking through a finder of the camera of FIG. 4.

With a camera of such construction, while looking through the finder as shown in FIG. 5, the operator will first align the camera in sight to an object intended to be photographed (in FIG. 5, a far distant house is aimed at). Then, the release button (not shown) is depressed to the first stroke, thereby the power switch SW is thrown to supply the circuit unit EU with electrical power from the battery B. Thus, the above described operation of the circuitry of FIG. 2 is initiated. When the range zone of the object OB is detected, the corresponding one of the light-emitting diodes LD1-LD4 is lit to illuminated the corresponding one of the marks 11a-11d in the mask plate 11. Therefore, as shown in FIG. 5, the consistent range zone of the object OB is indicated in the field of indication 14 above the field of view of the finder 13. That is, for example, as shown in FIG. 5, when the far distant house is shot, the first light emitting diode LD1 is lit with respect to the circuit of FIG. 2 to thereby illuminate the mark 11a in the mask plate 11. Thus, an image of the mark 11a can be viewed at the rightmost position in the field of indication 14, being a mountain-like one representative of the far distant zone. The operator will next turn the distance adjusting ring 7 until an image of the similar mark to the mountain-like mark 11a, that is, the mark 7a on the ring 7 appears in the display window 13a. Thus, the photo-taking lens 6 is appropriately focused for the object OB. After that, the operator may depress the release button to the second stroke with the start of an exposure.

In the case of the cine camera, when the range zone is changed during operation, the illuminated mark is shifted in the field of indication 14. Therefore, the operator need only to follow up the change by operating the distance adjusting ring 7. As a result, a correct focusing of the photo-taking lens 6 can be continuously performed.

Figure 6:
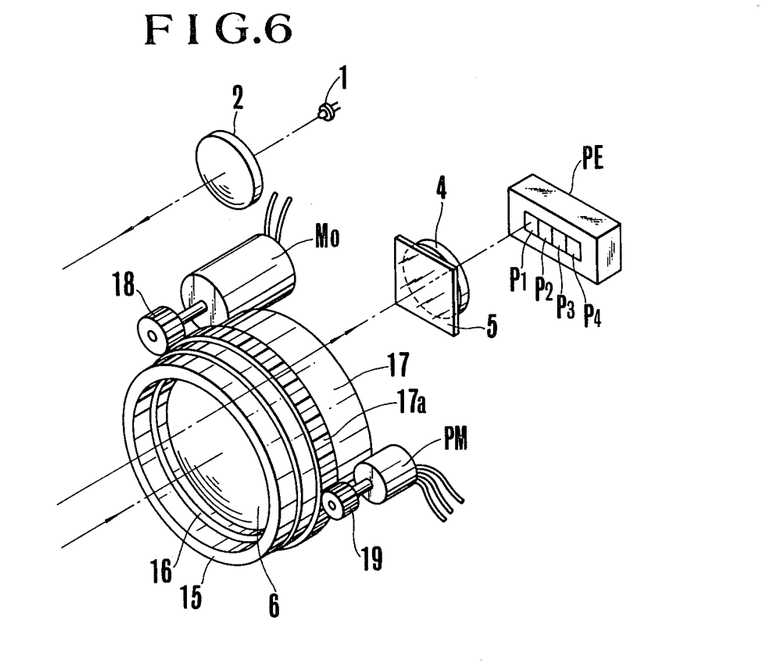
FIG. 6 is a fragmentary exploded perspective view of an example of an automatic focusing system constructed by applying the embodiment of FIG. 2 to a zone type automatic distance measuring device in a camera.

The foregoing is described in connection with the manually operated focusing system with the help of the zone mark indication. According to the embodiment of FIG. 2, it is readily possible to construct an automatic focusing system of the zone type. This is, therefore, exemplified below by reference to FIGS. 6 and 7. Referring first to FIG. 6, there is shown the essential parts of a camera employing this automatic focusing system. In the figure, the same reference numerals have been employed to denote the similar parts to those shown in FIGS. 1, 2 and 4. 15 is a fixed lens barrel in which the above described phot-taking lens 6 is axially movable while being supported by a lens mount sleeve 16; 17 is a lens drive ring rotatably fitted on the fixed barrel 15 and restricted from axial movement to permit only rotative movement about the optical axis of the lens 6. Formed in a portion of the outer periphery of the lens drive ring 17 is a gear 17a. Though not shown here, the lens drive ring 17 is further provided with a cam groove formed in the inner surface thereof and into which a cam follower pin extends from the lens mount sleeve 16 through an axially elongated slot bored through the wall of the fixed barrel 15; Mo is an electric motor for driving the lens drive ring 17 to rotate, a pinion 18 being fixedly mounted on the output shaft of the motor Mo and engaging with the geared portion 17a of the lens drive ring 17. It is noted that the cam groove in the above described lens drive ring 17 is so configured that when the motor Mo rotates in the forward direction, the photo-taking lens 6 is moved to effect focusing toward the infinitly distant object. When in the reversed direction, toward shorter object distances, PM is a potentiometer for generating an electrical signal representative of the angular position of the drive ring 17, as a pinion 19 fixedly mounted on the shaft of the potentiometer PM meshes with the geared portion 17a. When the photo-taking lens is moved to effect focusing for infinitely distance object, the output voltage of the potentiometer PM is increased.

Figure 7:
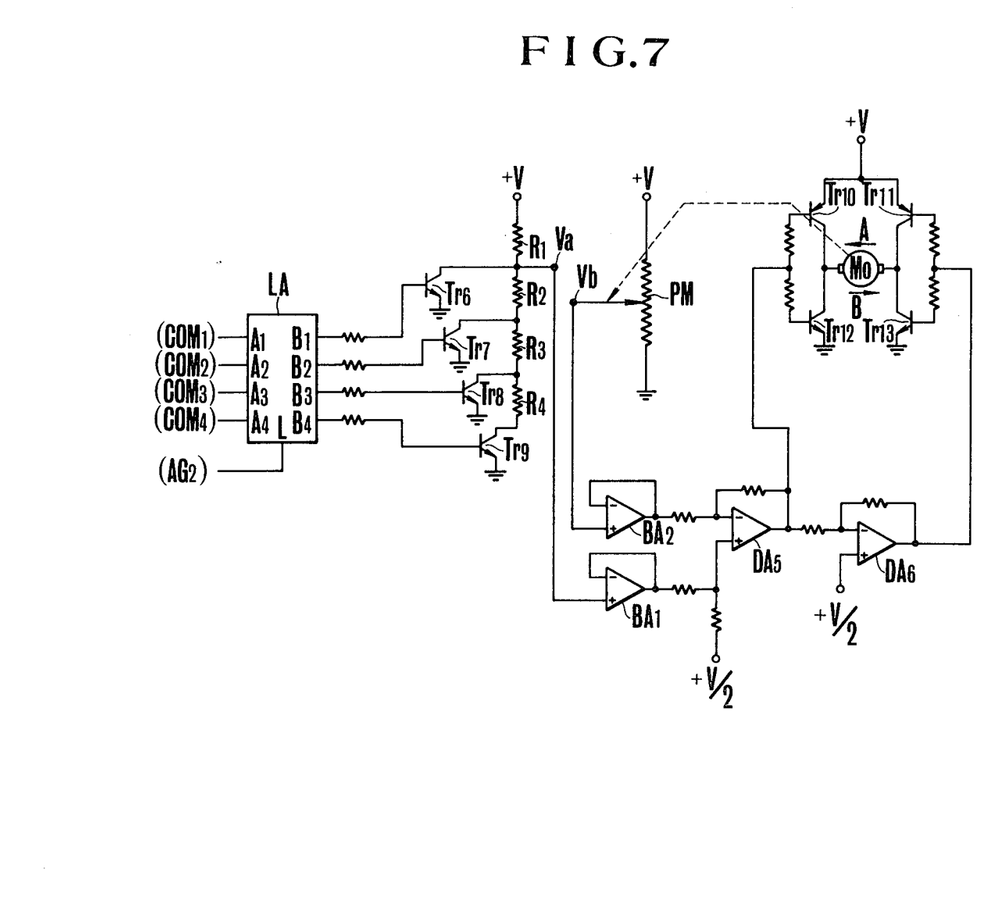
FIG. 7 is an electrical circuit diagram of the camera of FIG. 6 except for the circuit of FIG. 2.

FIG. 7 shows a motor drive control circuit adapted to cooperate with the circuit of FIG. 2 in the automatic focusing system of FIG. 6. R1, R2, R3 and R4 are resistors for distance information having resistance values in a ratio of 3:1:2:6 and connected in series to each other across the voltage V. Tr6, Tr7, Tr8 and Tr9 are switching transistors with their collectors connected successively to the junction points between the resistors R1 to R4 and the circuit ground with their emitters grounded and with their bases connected to the respective outputs B1 to B4 of the latch circuit LA through respective resistors; BA1 is a buffer amplifier for impedance-converting the output Va of the series circuit of the resistors R1–R4; BA2 is similarly a buffer amplifier for impedance-converting the output Vb of the above described potentiometer PM; DA5 is a difference amplifier having an inversion input connected to the buffer amplifier BA2 and a non-inversion input connected to the output of the buffer amplifier BA1 so that a difference between the outputs of the buffer amplifiers BA1 and BA2 is obtained. Further, fed to the non-inversion input of the difference amplifier DA5 is a voltage of V/2 through a resistor; DA6 is a difference amplifier for inverting the output of this difference amplifier DA5 with its inversion input connected to the output of said difference amplifier DA5 and with its non-inversion input fed with a voltage of V/2; Tr10, Tr11, Tr12 and Tr13 are switching transistors connected to each other to control the direction of rotation of the motor Mo the above described motor Mo being inserted in between a junction point of the collectors of the transistor Tr10 and Tr12 and a junction point of the collectors of the transistors Tr11 and Tr13, the bases of the transistors Tr10 and Tr12 being connected through respective resistors to the output of the difference amplifier DA5, and the bases of the transistors Tr11 and Tr13 being connected through respective resistors to the output of the difference amplifier DA6. The emitters of the transistors Tr10 and Tr11 are fed with the voltage V, and the emitters of the transistors Tr12 and Tr13 are connected to the circuit ground.

In operating the circuit of FIG. 7, when the distance detection by the circuit of FIG. 2 has been completed, a voltage representative of the detected distance appears at the output terminal Va of the series connected resistors R1–R4. In more detail, when the output B1 of the latch circuit LA is of high level, then $Va = 0$, when the output B2 of high level, then $Va = V/4$, when the output B3 of high level, then $Va = V/2$, and when the output B4 of high level, then $Va = 3V/4$. If the thus determined output Va is different from the output Vb of the above described potentiometer PM as detected by the difference amplifier DA5, for instance, $Va > Vb$, (that is, the photo-taking lens 6 is focused for an object at a shorter distance than the actual object distance) the output of the difference amplifier DA5 is larger than zero, and the output of the difference amplifier DA6 is smaller than zero, so that, of the transistors Tr10–Tr13, only two, namely, Tr11 and Tr12 are turned on to allow a current to flow through the motor Mo in a direction indicated by an arrow A in FIG. 7, thereby the motor Mo is energized to rotate in the forward direction. Therefore, the photo-taking lens 6 is driven to move toward the infinitely distant side by the lens drive ring 17. As the photo-taking lens 6 is moving, the output Vb of the potentiometer PM is increased gradually. When $Va = Vb$ is attained, the output of the difference amplifier DA5 becomes zero, causing the transistor Tr12 to be turned off, and therefore causing the motor Mo to be de-energized, and then stopped. Therefore, at this point in time, the correct focusing of the photo-taking lens 6 is effected.

On the other hand, when $Va < Vb$, (that is, the photo-taking lens 6 takes a focusing position for more distant object than the actual one), the output of the difference amplifier DA5 is smaller than zero, and the output of the difference amplifier DA6 is larger than zero. Of these transistors Tr10–Tr13, therefore, the transistors Tr10 and Tr13 are turned on to allow a current to flow through the motor Mo in a direction indicated by an arrow B, and therefore the motor Mo is energized to rotate in the reversed direction, with simultaneous movement of the photo-taking lens 6 toward focusing positions for shorter object distances. As the photo-taking lens 6 is moving, the output voltage Bv, Bv of the potentiometer PE is decreased gradually. Upon attainment of $Va = Vb$, the output of the difference amplifier DA6 becomes zero at which the transistor Tr13 is turned off to de-energize the motor Mo. Thus, the motor Mo is stopped from further rotation.

In the embodiment shown in FIGS. 6 and 7, automatic focusing of the photo-taking lens 6 can be accomplished in the above-described manner. Nevertheless, it will be advantageous in practice to provide for the automatic focusing system of FIGS. 6 and 7 with the indication system of FIG. 4 comprising the light-emitting diodes LD1-LD4, mask plate 11 and prism 12.

According to another feature of the present invention, it is possible to employ a charge storage type photo-sensor device known by the name BBD, CCD, or CCD photo-diodes as the photoelectric light receiving means. The use of such photo-sensor device gives an advantage of constructing the photo-sensitive elements P1-P4, memory elements C1-C4, C'1-C4, and gate elements GA1-GA4, GA'1-GA'4, GB1-GB4, GB'1-GB'4 in a single semi-conductor device. Another advantage is that the gate elements GC1-GC4, GC'1-GC'4 for clearing the memorized values are no longer necessary.

Figure 8:
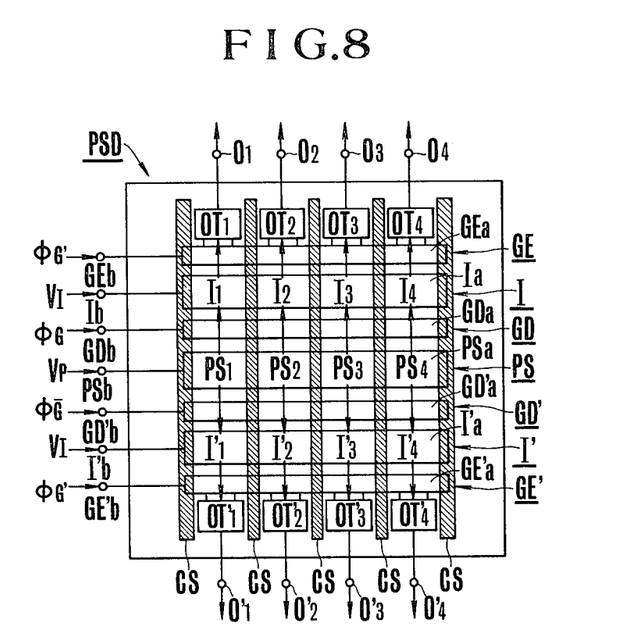
FIG. 8 is a schematic plan view of an example of a charge accumulation type photosensor device usable in the device of the present invention.
Figure 9:
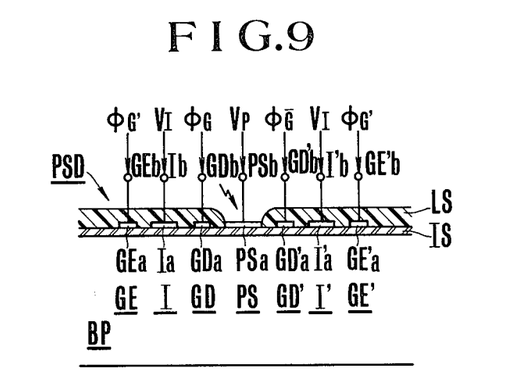
FIG. 9 is a schematic sectional view of the photosensor device of FIG. 8.

An example of a charge storage type photo-sensor device usable in the device of the present invention will next be described in particular reference to CCD or CCD photo-diode. Referring first to FIGS. 8 and 9, the structure of this photo-sensor device is schematically illustrated. In the figures, the said photo-sensor device is generally indicated at PSD. PS is a photo-sensor portion for generating a charge in response to the incident light shown in correspondence with the above described embodiments as having four sensor elements PS1, PS2, PS3 and PS4; PSa is a photo-gate electrode; PSb is an input terminal connected to said electrode PSa and here fed with a photo-gate voltage Vp to form potential wells in the individual sensor elements PS1, PS2, PS3, PS4. It is noted that in the case of the CCD photo-diode, the sensor elements PS1-PS4 are photo-diodes of P-N junction; I and I' are first and second charge storing portion groups for storing the charges generated in the above described photo-sensor portion PS, each having four charge storage portions I1, I2, I3, I4, and I'1, I'2, I'3, I'4 corresponding to the individual sensor elements PS1, PS2, PS3, PS4; Ia and I'a are electrodes; Ib and I'b are input terminals connected to the electrodes Ia and I'a respectively and here fed with a storage portion voltage V1 to form potential wells for charge storage in the individual charge storage portions I1, I2, I3, I4 and I'1, I'2, I'3 and I'4; GD is a first control gate portion for controlling the flow of the charge generated in the photo-sensor portion PS to the first charge storage portion group I; GDa is its electrode; GDb is an input terminal connected to said electrode GD and here supplied with a gate pulse $\phi g$; GD' is a second control gate portion for controllingl the flow of the charge generated in the photo-sensor portion PS to the second charge storage portion group I'; GD'a is its electrode; GD'b is an input terminal connected to said electrode GD'a and here supplied with a gate pulse $\bar{\phi}g$; OT1, OT2, OT3, OT4 and OT'1, OT'2, OT'3, OT'4 are output portions from which the charge stored in the individual charge storage portions I1, I2, I3, I4 and I'1, I'2, I'3, I'4 in the first and second charge storage portion groups I and I' after having been converted to voltage information are produced; 01, 02, 03, 04, and 0'1, 0'2, 0'3, 0'4 are respective output terminals; GE and GE' are output control gate portions for controlling the flow of the charge stored in the individual charge storage portions I1, I2, I3, I4 in the first charge storage portion group I to the output portions OT1, OT2, OT3, OT4 and the flow of the charge stored in the individual charge storage portions I'1, I'2, I'3, I'4 in the second charge storage portion group I' to the output portions OT'1, OT'2, OT'3, OT'4 respectively; GEa and GE'a are electrodes respectively; and GEb and GE'b are input terminals connected to these electrodes GEa and GE'a and here supplied with a gate pulse $\phi g'$.

In FIG. 9, BP is a substrate plate of the photo-sensor device, here taking, for example, P type Si substrate plate; IS is an insulating layer such as SiO2; LS is a light shielding layer formed by aluminum deposition and covering the entire surface except the photo-sensor portion PS. Again, in FIG. 8, CS is a channel stopper for preventing communication of the potential wells between the adjacent elements to each other including the photo-sensor portion PS, control gate portions GD, GD', charge storage portions I, I', control gate portion GE, GE' and output portions OT1-OT4, OT'1-OT'4. Such channel stopper may be formed by dopping impurities so as to be P+ provided that the substrate BP is of P type Si.

Figure 10:
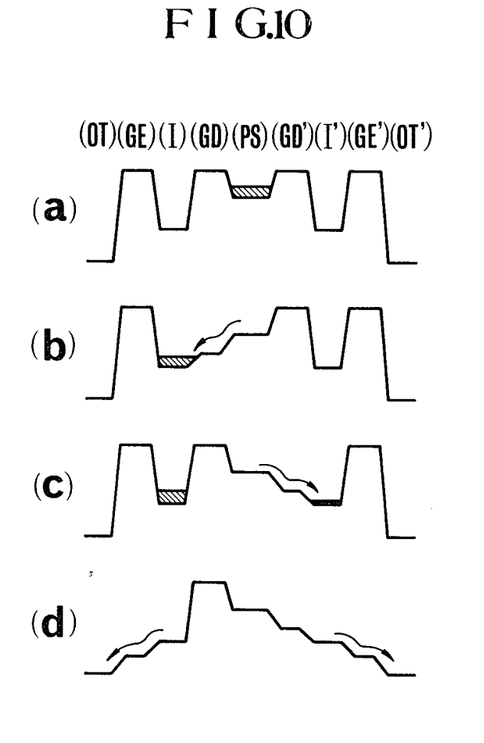
FIG. 10 is schematic diagrams showing a variation of the internal potential of the photosensor device of FIGS. 8 and 9 and how the charge is caused to flow thereby.

With the photo-sensor device PSd of such construction, when the photo-gate voltage Vp (for example, 2.5V) and the storage portion voltage V1 (for example, 7.5V) are applied respectively to the photo-sensor portion PS at the input terminal PSb and to the first and second charge storage portion groups I and I' at the input terminals Ib and I'b, a potential well is formed in each of the sensor PS1, PS2, PS3, PS4 and the charge storage portions I1, I2, I3, I4 and I'1, I'2, I'3, I'4, as shown in FIG. 10(a). At this time, if light is incident upon the photo-sensor portion PS, the individual sensor elements PS1, PS2, PS3, PS4 generate charges with magnitudes corresponding to the intensities of light incident thereon, which are stored in the respective potential wells. During this time, when a voltage of about 5 volts is applied to the first control gate portion GD through the input terminal GDb, as shown in FIG. 10(b), a potential well is formed in said first control gate portion GD so that potential gradients from the individual sensor elements PS1, PS2, PS3, PS4 to the respective charge storage portions I1, I2, I3, I4 in the first charge storage portion group I permit the flow of the charges generated in the sensor elements PS1, PS2, PS3 and PS4 through the first control gate portion GD to the charge portions I1, I2, I3, I4 in the first charge storage portion group I respectively. Then, the application of the voltage to the first control gate portion GD is cut off, and instead a voltage of about 5 volts is applied to the second control gate portion GD' through the input terminal GD'b. At this time, as shown in FIG. 10(c), a potential well is formed in the second control gate portion GD', so that potential gradients from the individual sensor elements PS1, PS2, PS3 and PS4 to the respective charge storage portions I'1, I'2, I'3, I'4 in the second charge storage portion group I' permit the flow of the charges generated in the sensor elements PS1, PS2, PS3, PS4 through the second control gate portion GD' to the charge storage portions I'1, I'2, I'3, I'4 in the second charge storage portion group I' respectively.

By employing the outputs Q and $\bar{Q}$ of the flip-flop FF of FIG. 2 as the gate pulses $\phi g$, $\bar{\phi}g$ for the first and second gate portions GD and GD', therefore, it is possible to accumulate the charges from the sensor elements PS1, PS2, PS3, PS4 on the respective charge storage portions I1, I2, I3, I4 in the first charge storage portion group I when the above-described light source 1 is lit, and, on the other hand, the charges from the sensor elements PS1, PS2, PS3, PS4 on the respective charge storage portions I'1, I'2, I'3, I'4 in the second charge storage portion group I' when the light source 1 is quenched. (It is noted that the voltage of the pulse output Q and $\overline{Q}$ must be adjusted to about 5 volts).

By suitable timing, when a voltage of about 10 volts is applied through the input terminals GE and GE' to the control gate portions GE and GE' simultaneously, as shown in FIG. 10(d), potential wells are formed in these control gate portions GE and GE' so that potential gradients are formed from the individual charge storage portions I1, I2, I3, I4 in the first charge storage portion group I to the respective output portions OT1, OT2, OT3, OT4 and also from the individual charge storage portions I'1, I'2, I'3, I'4 in the second charge storage portion group I' to the respective output portions OT'1, OT'2, OT'3, OT'4 to permit the flow of the charges accumulated on the individual charge storage portions I1, I2, I3, I4 and I'1, I'2, I'3, I'4 through the respective gate portions GE and GE' to the respective output portions OT1, OT2, OT3, OT4 where they are converted to the corresponding voltage informations to the charges stored, and then produced from the output terminals O1, O2, O3, O4 and O'1, O'2, O'3, O'4. Therefore, if the individual difference amplifiers DA1, DA2, DA3 and DA4 of FIG. 2 are connected at their non-inversion and inversion inputs to the output terminals O1 and O'1, O2 and O'2, O3 and O'3, and O4 and O'4, respectively, an equivalent result to that described in connection with the FIG. 2 embodiment will be effected.

For the gate pulse $\phi g'$ for the control gate portions GE and GE' use may be made of the output of the AND gate AG2 of FIG. 2 (FIG. 3(h)). It is of course necessary to adjust the voltage when it substantially deviates from the required value.

As has been described above, the device of the invention separates the outputs of the individual photo-sensitive elements dependent upon whether or not the light projecting means is energized, and memorizes them while being integrated. Thus, the difference between the integrated values on each pair of memory elements is obtained by the differential circuit upon comparison with the other ones through the comparing circuits to detect the distance to the target object. Accordingly, even when the intensity of light projected from the projecting means is very weak, it is possible to obtain a signal of level large enough to be used as the detection output. Therefore, the device of the invention is applicable to an instrument of small size such as a camera of detectable limited electrical power capacity. Further, the range of distances can be extended. Further, because of the perfect removal of the noise due to the ambient light, even when the environment is very bright, there is no occasion to encounter the situation where the distance can not be detected. Or, when the environmental illumination is varied to a large extent, there is no possibility of occurrence of faulty operation. As a whole, the distace measuring performance of this kind of deice can be sufficiently assured, so that upon application to the distance adjusting device in the camera, many remarkable advantages can be derived.

Since the embodiment of FIGS. 2 to 7 is adapted to relatively roughly divide the range of object distances with reduction of the number of photosensitive elements, the construction of the electrical circuit is simplified to as to be suited for use in the middle class camera for the beginner.

Again, as explained in connection with FIGS. 8 to 10, the device of the invention can utilize the charge storage type photo-sensor device known as BBD, CCD, or CCD photo-diode as the photoelectric light receiving means. Such photo-sensor device can be obtained at a low cost, since semi-conductor techniques have recently achieved a rapid advance. From such stand point also, therefore, the device of the present invention is very advantageous.

What is claimed is:

1. A distance measuring device comprising:
    (a) light projecting means for projecting light to a target object;
    (b) light receiving means provided in a position for receiving the reflected light from said target object to produce an electrical signal corresponding to the reflected light from said target object, said light receiving means having a plurality of light receiving elements independent of each other and arranged in such positions so as to correspond to different object distances from each other;
    (c) memory means coupled to the output terminals of said light receiving means to memorize the electrical signals from said light receiving means, said memory means having a first memory group consisting of a plurality of memory elements connected to the respective light receiving elements, and a second memory group consisting of a plurality of memory elements connected to said respective light receiving elements;
    (d) control means coupled to said light projecting means to intermittently energize said light projecting means;
    (e) first means coupled to said first memory group to permit the transfer of the electrical signals produced from the light receiving means in synchronism with energization of said light projecting means to said first memory group, each of the plurality of memory elements of the first memory group memorizing a plurality of electrical signals generating from the corresponding light receiving elements in synchronism with each of the plurality of de-energizations of said light projecting means;
    (f) second means coupled to said second memory group to permit the transfer of the electrical signals produced from the light receiving means in synchronism with de-energization of said light projecting means to said second memory group, each of the plurality of memory elements of the second memory group memorizing a plurality of electrical signals generating from the corresponding light receiving elements in synchronism with each of the plurality of de-energizations of said light projecting means;
    (g) differential means having a plurality of differential elements connected to the outputs of the memory elements in said first memory group and the outputs of the second memory elements in said second memory group corresponding to said memory elements to produce signals corresponding to the differences between the outputs of the memory elements in the first memory group and the outputs of the memory elements in the second memory group corresponding to said memory elements; and
    (h) comparing means for producing a signal corresponding to said target object distance by comparing the outputs of said plurality of differential elements.

2. A distance measuring device according to claim 1, wherein said control means includes an oscillator for producing a control signal.

3. A distance measuring device according to claim 2, wherein said first means is formed by a gate group connected between said light receiving means and said first memory group.

4. A distance measuring device according to claim 3, wherein said gate group has control electrodes responsive to the control signal from said oscillator.

5. A distance measuring device according to claim 4, wherein said control means further includes a semi-conductor elements responsive to the control signal from the oscillator to control the electrical power supply path of said light projecting means.

6. A distance measuring device according to claim 5, wherein said semi-conductor element is formed by a transistor.

7. A distance measuring device according to claim 3, wherein said gate group is formed by a plurality of FETs.

8. A distance measuring device according to claim 1, further including control gate means connected between said first and second memory groups and said differential means to supply the output of said first memory group and the output of said second memory group to said differential means corresponding thereto.

9. A distance measuring device according to claim 4, further including control gate means connected between said first and second memory groups and said differential means to supply the output of said first memory group and the output of said second memory group to said differential means corresponding thereto.

10. A distance measuring device according to claim 9, wherein said control gate means has a control electrode responsive to the control signal from said control gate means.

11. A distance measuring device according to claim 1, wherein said differential elements are formed by differential circuits.

12. A distance measuring device according to claim 1, wherein said light sensitive means is formed by a plurality of silicon photo diodes.

13. A distance measuring device according to claim 12, wherein said first and second memory groups include condensers, and the voltages corresponding to the currents flowing through the individual silicon photo diodes are integrated and stored in said respective condensers.

14. A distance measuring device according to claim 1, wherein said comparing means includes a plurality of comparing elements connected to the respective differential elements in said differential means.

15. A distance measuring device according to claim 1, further including indicating means connected to said comparing means for indicating distance information in response to the signal from said comparing means.

16. A distance measuring device according to claim 15, wherein said indicating means has a plurality of indicating elements for indicating different distance informations from each other.

* * * * *